United States Patent
Ives et al.

(10) Patent No.: US 9,402,011 B2
(45) Date of Patent: Jul. 26, 2016

(54) SINGLE-FACET SPINDLE IMPLEMENTATION FOR A LASER SCANNER SYSTEM

(71) Applicant: HEWLETT-PACKARD DEVELOPMENT COMPANY, L.P., Houston, TX (US)

(72) Inventors: Thomas Wayne Ives, Boise, ID (US); Terry M. Nelson, Boise, ID (US); Bartley Mark Hirst, Boise, ID (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/760,285

(22) PCT Filed: Jan. 29, 2013

(86) PCT No.: PCT/US2013/023629
§ 371 (c)(1),
(2) Date: Jul. 10, 2015

(87) PCT Pub. No.: WO2014/120122
PCT Pub. Date: Aug. 7, 2014

(65) Prior Publication Data
US 2015/0326746 A1  Nov. 12, 2015

(51) Int. Cl.
*H04N 1/04* (2006.01)
*H04N 1/028* (2006.01)
(Continued)

(52) U.S. Cl.
CPC ............. *H04N 1/02825* (2013.01); *B41J 2/471* (2013.01); *G02B 26/12* (2013.01); *H04N 1/113* (2013.01); *H04N 2201/0246* (2013.01); *H04N 2201/02456* (2013.01); *H04N 2201/04744* (2013.01)

(58) Field of Classification Search
CPC ... H04N 9/3129; H04N 13/0275; H04N 1/04; H04N 2201/04744; B60K 35/00; B60K 2350/2052; B60K 37/00; B82Y 20/00; G05B 19/4097; G05B 2219/35075; G07F 11/36; G07F 11/38; G07F 11/42; G07F 9/026
USPC .......... 348/46, 47, 745, 79, E13.004; 355/67, 355/72; 358/1.15, 1.13, 474, 480
See application file for complete search history.

(56) References Cited

U.S. PATENT DOCUMENTS

| 4,908,951 A * | 3/1990 | Gurny ................... G01B 21/04 33/1 M |
| 4,939,356 A | 7/1990 | Rando et al. |

(Continued)

OTHER PUBLICATIONS

International Searching Authority, The International Search Report and the Written Opinion, Oct. 18, 2013, 10 Pages.

*Primary Examiner* — Negussie Worku
(74) *Attorney, Agent, or Firm* — HP Inc. Patent Department

(57) ABSTRACT

A system includes a laser scanner system. The system includes a scanner laser to generate an optical scanning beam. The system also includes a spindle assembly comprising a spindle that extends along an axis and reflects the optical scanning beam. The system also includes a beam detector to receive the reflected optical scanning beam from the single facet and to indicate when to generate a latent image corresponding to an image based on the optical scanning beam for a given scan operation. The system further includes a scan controller to control the scanner laser such that the optical scanning beam is reflected from only a single facet of the spindle during the given scan operation.

15 Claims, 2 Drawing Sheets

(51) Int. Cl.
  *H04N 1/113*   (2006.01)
  *B41J 2/47*    (2006.01)
  *G02B 26/12*   (2006.01)

(56) References Cited

U.S. PATENT DOCUMENTS

| | | | |
|---|---|---|---|
| 5,142,173 A * | 8/1992 | Konno | F16C 17/107 |
| | | | 310/67 R |
| 5,310,263 A * | 5/1994 | Lee | C10M 103/06 |
| | | | 384/100 |
| 6,215,219 B1 * | 4/2001 | Hwang | F16C 39/063 |
| | | | 29/898.02 |
| 6,382,514 B1 | 5/2002 | Chung | |
| 6,636,903 B2 * | 10/2003 | Endoh | G06F 3/1204 |
| | | | 358/1.1 |
| 6,873,427 B1 * | 3/2005 | Matsuda | H04N 1/00931 |
| | | | 358/1.1 |
| 6,891,630 B1 | 5/2005 | Miyasaka et al. | |
| 7,003,241 B1 | 2/2006 | Kobayashi et al. | |
| 7,245,409 B2 | 7/2007 | Tamaru | |
| 7,369,584 B2 * | 5/2008 | Goldman | H04N 9/3129 |
| | | | 348/764 |
| 2001/0009471 A1 * | 7/2001 | Ito | B41J 2/473 |
| | | | 359/204.1 |
| 2001/0046712 A1 | 11/2001 | Hang et al. | |
| 2002/0175988 A1 * | 11/2002 | Hoover | H04N 1/053 |
| | | | 347/116 |
| 2007/0002396 A1 * | 1/2007 | Naruse | H04N 1/00519 |
| | | | 358/474 |
| 2007/0049476 A1 | 3/2007 | Belcastro et al. | |
| 2010/0039680 A1 * | 2/2010 | Yoon | B23K 26/0853 |
| | | | 358/474 |
| 2010/0301232 A1 | 12/2010 | Erlbacher et al. | |
| 2011/0216377 A1 * | 9/2011 | Herloski | H04N 1/04 |
| | | | 358/474 |
| 2012/0188614 A1 * | 7/2012 | Azegrouz | A61B 3/1025 |
| | | | 358/474 |
| 2015/0241831 A1 * | 8/2015 | Tanonaka | G03G 15/205 |
| | | | 399/33 |

* cited by examiner

SINGLE-FACET SPINDLE IMPLEMENTATION FOR A LASER SCANNER SYSTEM

BACKGROUND

Laser scanner systems can typically implement a pulsed laser signal that is reflected from facets of a rotating spindle to generate a latent image that corresponds to a scanned image. Typical laser scanner spindles can include a plurality of facets that are each mirrored to reflect the pulsed laser signal at each respective angle of the spindle as it is rotated. Relative errors in the facets of the spindle can result in print defects, such as laser scanner moiré. For example, slight variations in positioning, orientation, and flatness of the facets relative to each other can result in such print and scan defects. These print and/or scan detects can thus negatively affect the quality of the scanning of images. Such print and/or scan defects can be even more pronounced in implementations that include more than one color pane.

DETAILED DESCRIPTION

Figure 1:
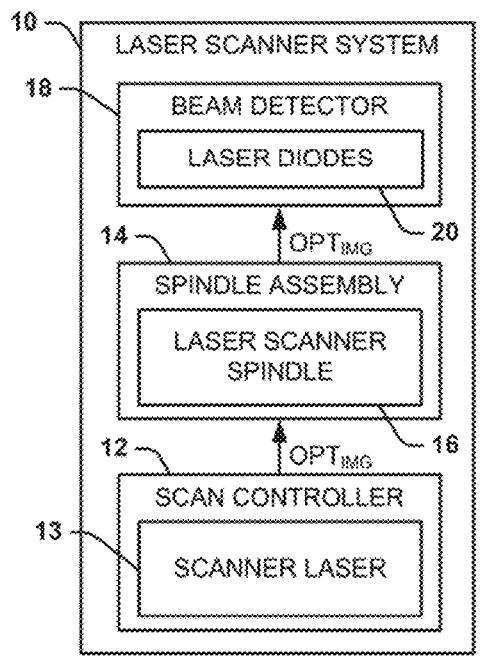
FIG. 1 illustrates an example of a laser scanner system.

FIG. 1 illustrates an example of a laser scanner system 10. The laser scanner system 10 can be implemented in a variety of laser scanning and/or printing devices. The laser scanner system 10 includes a scan controller 12 that is configured to control a scanner laser 13 for each scan operation. The scanner laser 13 that is configured to generate an optical scanning beam $OPT_{IMG}$. The scanner laser 13 can provide the optical scanning beam $OPT_{IMG}$ as a pulsed laser signal at a power that is sufficient for the creation of a latent image based on the operation of the scan controller 12, as described in greater detail herein.

The laser scanner system 10 also includes a spindle assembly 14 that includes a laser scanner spindle 16. The optical scanning beam $OPT_{IMG}$ is provided to the laser scanner spindle 16 that is rotated by additional components in the spindle assembly 14. For example, the spindle assembly 14 can include a motor to rotate the laser scanner spindle 16 and a bearing system to couple the laser scanner spindle 16 to a rotor associated with the motor. The laser controller 12 can be configured to control the scanner laser 13 in a manner in which the optical scanning beam $OPT_{IMG}$ is reflected from only a single facet of the laser scanner spindle 16 during a given scan operation to generate the latent image. In other words, the optical scanning beam $OPT_{IMG}$ is reflected only from the single facet of the laser scanner spindle 16 during a given scan operation. As described herein, the term "scan operation" refers to the creation of a single latent image using the laser scanner system 10. As one example, the laser scanner spindle 16 can include only the single facet, such that the single facet is implemented for reflecting the optical scanning beam $OPT_{IMG}$. As another example, the laser scanner spindle 16 can include a plurality of facets, but for a given scan operation, the optical scanning beam $OPT_{IMG}$ is reflected from only a single one of the plurality of facets. As yet an example, the optical scanning beam $OPT_{IMG}$ can be reflected from the single facet at each full rotation of the laser scanner spindle 16.

The laser scanner spindle 16 can thus reflect the incident optical scanning beam $OPT_{IMG}$ only during a specific active angle of rotation of the laser scanner spindle 16 at which the optical scanning beam $OPT_{IMG}$ can be incident on the single facet based on the scan controller 12. The reflected optical scanning beam $OPT_{IMG}$ is provided from the laser scanner spindle 16 to a beam detector 18 that includes a plurality of photodetectors 20 that collectively form an optical photoconductor (OPC) system. As an example, the photodetectors 20 can be configured as phototransistors and/or as PIN-type photodiodes. The OPC system can thus generate a latent image for each scan line associated with the optical scanning beam $OPT_{IMG}$.

Slight variations in positioning, orientation, and flatness of multiple facets relative to each other for a typical laser spindle can result in print and scan defects, such as moiré. For example, typical laser scanner systems implement a spindle with more than one facet (e.g., ten facets). Eccentricity of the polygon mirror relative to a center axis of the rotor of the motor in a typical laser spindle can be a primary source of scanner moiré, along with other contributing factors such as mirror-to-mirror grinding angle errors. However, by implementing only a single facet on the laser scanner spindle 16, the laser scanner system 10 can provide the latent image in a manner that results in substantially no print and/or scan defects. Because scan and/or print defects can result from variations in positioning, orientation, and flatness of one facet relative to other facets, implementing a single facet in a non-polygon mirror arrangement alleviates such defects based on the consistent and repeatable performance of the reflection from the single facet. Accordingly, laser scanner moiré is substantially mitigated in implementing the laser scanner system 10.

In addition, based on implementation of certain parameters for the scanner laser 13, as well as the spindle motor and bearing system as part of the spindle assembly 14, the laser scanner system 10 can provide scanning capability at speeds that are at least as fast as typical laser scanner systems that implement spindles that include more than one facet (e.g., ten facets). Accordingly, the laser scanner system 10 can provide scanning capability that is substantially free of defects, such as scanning moiré, while maintaining a rapid scanning speed. Additionally, because the laser scanner spindle 16 can include only a single facet, as opposed to a larger number of facets for typical laser spindles, the laser scanner spindle 16 can be substantially reduced in size relative to typical laser spindles, as described in greater detail herein. Furthermore, by eliminating a polygon mirror arrangement in the laser scanner system 10, air drag on sharp edges of the polygon is eliminated, thus substantially reducing acoustic noise that can be a nuisance in office environments.

Figure 2:
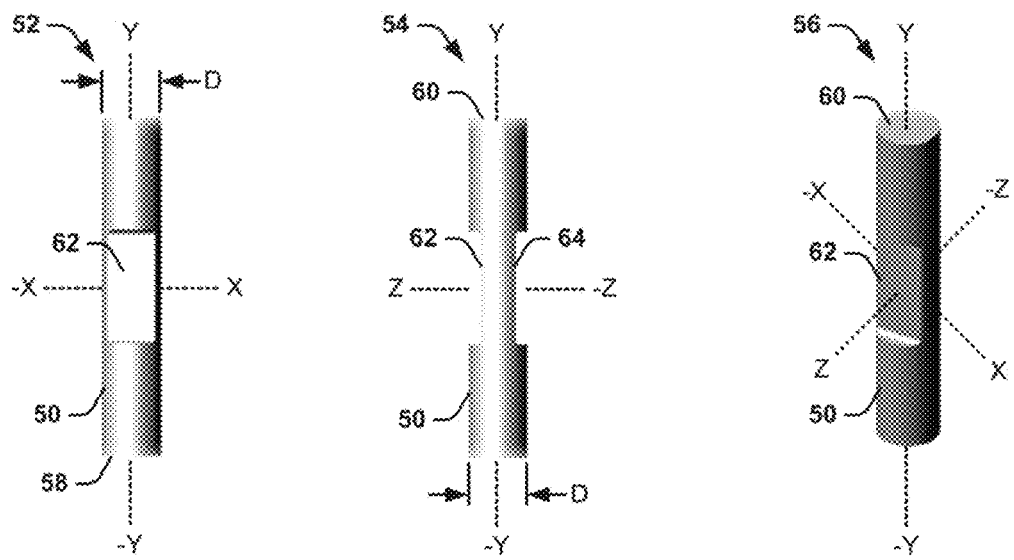
FIG. 2 illustrates an example of a laser scanner spindle.

FIG. 2 illustrates an example of a laser scanner spindle 50. The laser scanner spindle 50 is demonstrated in the example of FIG. 2 in three plan views, demonstrated as 52, 54, and 56, respectively, with X, Y, and Z axial designations. The laser scanner spindle 50 can correspond to the laser scanner spindle 16 in the spindle assembly 14 in the example of FIG. 1. Therefore, reference is to be made to the example of FIG. 1 in the following description of the example of FIG. 2.

The laser scanner spindle 50 is substantially cylindrical in shape, with a defined outer diameter "D" of the cylindrical shape, and extends along an axis, demonstrated as the Y-axis in the example of FIG. 2, between a first end 58 and a second end 60. As an example, the outer diameter "D" can be substantially less than typical laser spindles (e.g., one-tenth the diameter of typical laser spindles). For example, the outer diameter "D" of the laser scanner spindle 50 can be less than 3 mm. As described herein, "substantially cylindrical" can be provided to mean cylindrical to have a circular cross-section with respect to the Y-axis, or can be used to mean prismatic with respect to the shape of the laser scanner spindle 50, such as to have any of a variety of cross-sectional shapes (e.g., hexagon, octagon, etc.) having a centroid located at the Y-axis. The laser scanner spindle 50 includes a first substantially planar surface 62 that extends along the axial length of the laser scanner spindle 50. The first substantially planar surface 62 is demonstrated in the example of FIG. 2 as being centered along the length of the laser scanner spindle 50. The first substantially planar surface 62 is demonstrated as being substantially recessed with respect to the outer diameter, such that the first substantially planar surface 62 extends radially inward from the outer diameter, with X-axis edges of the first substantially planar surface 62 intersecting the outer diameter of the laser scanner spindle 50. The first substantially planar surface 62 can be mirrored, such that the first substantially planar surface 62 corresponds to the single facet to reflect the optical scanning beam $OPT_{IMG}$.

The laser scanner spindle 50 also includes a second substantially planar surface 64 that extends along the axial length of the laser scanner spindle 50. Similar to the first substantially planar surface 62, the second substantially planar surface 64 is demonstrated in the example of FIG. 2 as being centered along the length of the laser scanner spindle 50. The second substantially planar surface 64 is demonstrated as being substantially recessed with respect to the outer diameter, such that the second substantially planar surface 64 extends radially inward from the outer diameter, with X-axis edges of the second substantially planar surface 64 intersecting the outer diameter of the laser scanner spindle 50. In the example of FIG. 2, the second substantially planar surface 64 is congruent to the first substantially planar surface 62, and is disposed opposite the first substantially planar surface 64 with respect to the Y-axis.

As an example, the second substantially planar surface 64 may not be mirrored, such that only the first substantially planar surface 62 is mirrored. Therefore, the laser scanner spindle 50 could include only a single surface that could operate as the single facet (e.g., the first substantially planar surface 62). As another example, the second substantially planar surface 64 could also be mirrored, such as for ease in fabrication and/or installation. Therefore, either of the first and second substantially planar surfaces 62 and 64 could correspond to the single facet, such that the laser scanner system 10 is configured to reflect the optical scanning beam $OPT_{IMG}$ from only one of the first and second substantially planar surfaces 62 and 64 for a given scan operation to generate the latent image. The one of the first and second substantially planar surfaces 62 and 64 that operates as the single facet from which the optical scanning beam $OPT_{IMG}$ is reflected can be the same for every scan operation or could be arbitrary from one scan operation to the next. Regardless, the second substantially planar surface 64 can be provided on the laser scanner spindle 50 to balance the laser scanner spindle 50 for providing stability as it rotates at high speed, such as at least 100,000 RPM (e.g., 200,000 RPM). In addition, because the first and second substantially planar surfaces 62 and 64 are recessed (e.g., extending radially inward from the outer diameter), hoop stresses on the laser scanner spindle 50 can be significantly reduced to avoid shattering of the laser scanner spindle 50 at the high rotational speed.

Figure 3:
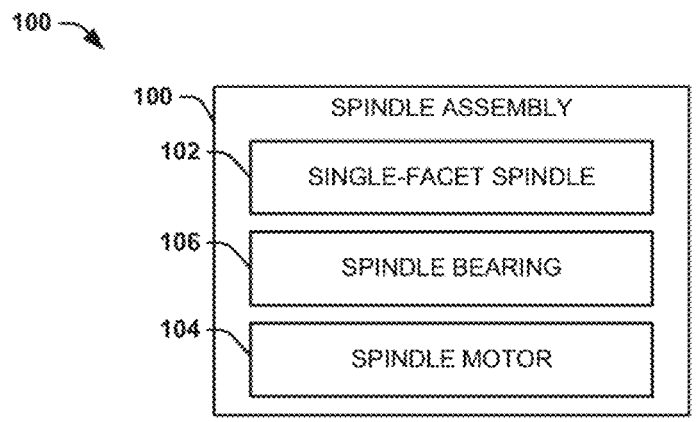
FIG. 3 illustrates an example of a spindle assembly.

FIG. 3 illustrates an example of a spindle assembly 100. The spindle assembly 100 can correspond to the spindle assembly 14 in the example of FIG. 1. Therefore, reference is to be made to the example of FIG. 1 in the following description of the example of FIG. 3.

The spindle assembly 100 includes a laser scanner spindle 102, which can correspond to the laser scanner spindle 50 in the example of FIG. 2. The spindle assembly 100 also includes a spindle motor 104 and a spindle bearing system 106. The spindle motor 104 can be configured to rotate the laser scanner spindle 102 at rapid speeds. For example, the spindle motor 104 can provide sufficient rotational speeds to achieve scanning speeds that are substantially comparable to typical laser spindles having a plurality of facets (e.g., ten facets). As an example, to achieve a scanning speed that is approximately comparable to a typical laser spindle that includes ten facets and that rotates at a speed of approximately 20,000 RPM, the spindle motor 104 can be configured to rotate the laser scanner spindle 102 at ten times the speed of the typical laser spindle (e.g., 200,000 RPM). The spindle motor 104 can be configured, for example, as a switched two-phase DC induction motor, which can be a brushless motor, that includes an outside stator and an inside rotor configuration. With such a configuration, the spindle motor 104 can achieve the rotation speed to rotate the laser scanner spindle 102 to provide scanning speeds that are comparable to typical laser scanner systems.

The spindle bearing system 106 is configured to couple the laser scanner spindle 102 to the spindle motor 104. Due to the substantially reduced diameter of the laser scanner spindle 102 relative to typical laser spindles, the spindle bearing system 106 can be implemented in a variety of configurations to achieve sufficient coupling at the high rotational speeds of the spindle motor 104. For example, the spindle bearing system 106 can be configured as an air bearing for both a radial bearing and for a thrust bearing at speed. As another example, the spindle bearing system 106 can also include a jewel bearing on which the laser scanner spindle 102 rotates prior to achieving critical speed for thrust air bearing launch. As yet another example, the spindle bearing system 106 can also or alternatively include a magnetic levitation bearing system. Accordingly, at the high rotational speeds provided by the spindle motor 104, the air and/or magnetic levitation bearing system in the spindle assembly 100 can support rotation of the laser scanner spindle 102 with substantially zero friction and wear, and provide a natural dampening characteristic.

Figure 4:
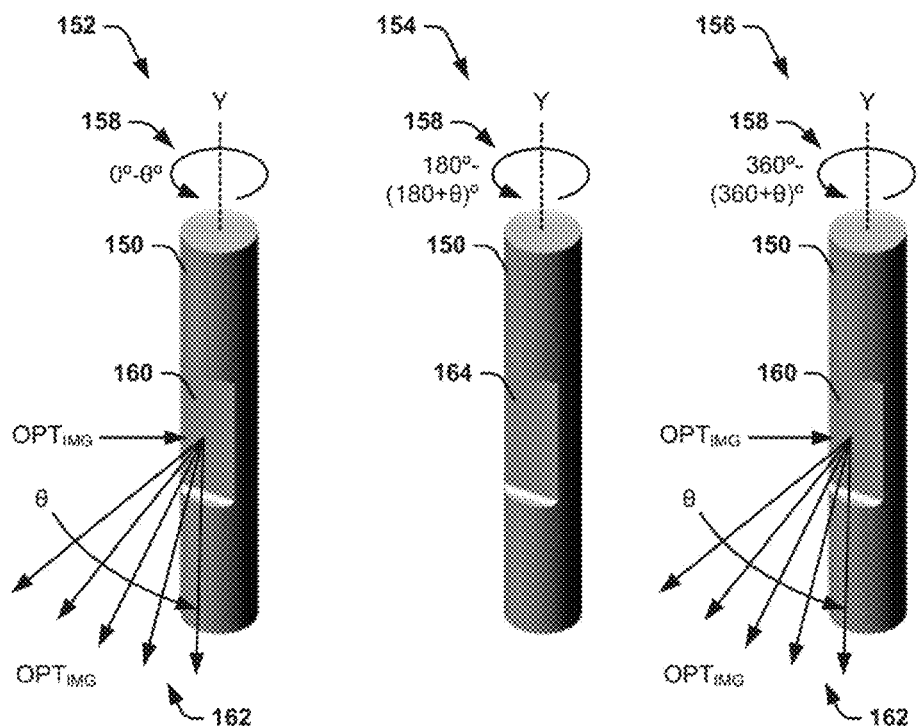
FIG. 4 illustrates another example of a laser scanner spindle.

FIG. 4 illustrates another example of a laser scanner spindle 150. The laser scanner spindle 150 can correspond to the laser scanner spindles 16, 50, and 102 in the examples of FIGS. 1-3. Therefore, reference is to be made to the examples of FIGS. 1-3 in the following description of the example of FIG. 4.

The laser scanner spindle 150 is provided in the example of FIG. 4 in three separate views, demonstrated in the example of FIG. 4 as 152, 154, and 156. In each of the views, the laser scanner spindle 150 is demonstrated as rotating about the Y-axis, demonstrated by the arrow 158, such as based on the rotation of the spindle motor 104 and the coupling of the laser scanner spindle 150 to the spindle motor 104 based on the spindle bearing system 106. The laser scanner spindle 150 is demonstrated as including a first substantially planar surface 160 that extends along the axial length of the laser scanner spindle 150 and which extends radially inward from the outer diameter of the laser scanner spindle 150. The first substantially planar surface 160 can correspond to the single facet of the laser scanner spindle 150. Therefore, in the example of FIG. 4, the optical scanning beam $OPT_{IMG}$ is provided onto the first substantially planar surface 160 as it rotates about the Y-axis. As an example, the optical scanning beam $OPT_{IMG}$ can be generated by the scanner laser 13 in the example of FIG. 1. Thus, the scanner laser 13 can generate the optical scanning beam $OPT_{IMG}$ in pulses that are substantially timed with an active reflection angle θ of the first substantially planar surface 160 for the optical scanning beam $OPT_{IMG}$ to be incident on the first substantially planar surface 160. Accordingly, the optical scanning beam $OPT_{IMG}$ can be reflected from the first substantially planar surface 160 across the active angle of reflection θ of the laser scanner spindle 150, as provided generally at 162.

In the first view 152, the laser scanner spindle 150 is demonstrated as rotating through the angle θ, such that in the first view 152, the laser scanner spindle 150 rotates from 0° to θ°. In the second view 154, the laser scanner spindle 150 is demonstrated as beginning its rotation at 180°, such that in the second view 154, the laser scanner spindle 150 rotates from 180° to (180±θ)°. In the second view 154, the laser scanner spindle 150 is demonstrated as including a second substantially planar surface 164. The second substantially planar surface 164 can be congruent to the first substantially planar surface 160 and can be provided on the laser scanner spindle 50 to balance the laser scanner spindle 150 for providing stability as it rotates at high speed (e.g., 200,000 RPM). The second substantially planar surface 164 can be mirrored to correspond to a second facet, or may not be mirrored. However, in the example of the second substantially planar surface 164 being mirrored, the second substantially planar surface 164 is not implemented as a facet to reflect the optical scanning beam $OPT_{IMG}$ in the example of FIG. 4.

In the third view 156, the laser scanner spindle 150 is demonstrated as beginning its rotation at 360°, such that in the third view 156, the laser scanner spindle 150 rotates from 360° to (360±θ)°. Therefore, because the laser scanner spindle 150 has performed a full rotation, the optical scanning beam $OPT_{IMG}$ can again be reflected from the first substantially planar surface 160 across the active angle of reflection θ of the laser scanner spindle 150, as provided generally at 162. Accordingly, the laser scanner spindle 150 implements only a single facet to reflect the optical scanning beam $OPT_{IMG}$ for the given scan operation, such as at each full rotation of the laser scanner spindle 150, to substantially mitigate scanning and/or printing defects.

Due to the substantially higher rotational speed of the laser scanner spindle 150, the scanner laser 13 can be configured to meet the requirements necessary for achieving a scanning speed that is substantially comparable to typical laser scanner systems. In the example provided previously with respect to FIG. 3, a typical ten-facet laser spindle can rotate at a speed of approximately 20,000 RPM. Thus, to achieve a comparable scanning speed, the spindle motor 104 can rotate the laser scanner spindle 150 at approximately 200,000 RPM (i.e., ten times the typical ten-facet laser spindle). The scanner laser 13 can thus be configured to provide the optical scanning beam $OPT_{IMG}$ at pulses that are approximately ten times that necessary for the typical ten-facet laser spindle, which can be achieved by a variety of different types of lasers.

In addition, the rapid rotation rate of the laser scanner spindle 150 results in the energy of the optical scanning beam $OPT_{IMG}$ being incident on the photodetectors 20 is substantially reduced relative to typical laser scanner systems (e.g., ten times less in the example of the ten-facet spindle). Therefore, the scanner laser 13 can be configured to generate the optical scanning beam $OPT_{IMG}$ at higher power (e.g., ten times the power than in typical laser scanner systems) to achieve the comparable and necessary amount of power to generate the respective latent image. However, because the scanner laser 13 provides the optical scanning beam $OPT_{IMG}$ less often than in typical laser scanner systems (e.g., one-tenth the time) based on the reduced number of facets and increased rotation speed, the average power consumed by the scanner laser 13 can be approximately the same as a scanner laser in a typical laser scanner system to achieve approximately the same scanning speed. As another example, the laser scanner system can include more than just a single laser (e.g., the scanner laser 13) for each color pane. By implementing multiple lasers per color pane, the power of each of the lasers can be substantially reduced, as can the rotational speed of the laser scanner spindle 150.

Furthermore, as described previously, because the laser scanner spindle 150 includes only the first substantially planar surface 160, as opposed to a larger number of facets for typical laser spindles, the laser scanner spindle 150 can be substantially reduced in size relative to typical laser spindles. For example, the laser scanner spindle 150 can have an outer diameter that is approximately one-tenth the diameter of a typical ten-facet laser spindle. Therefore, based on the relatively reduced diameter of the laser scanner spindle 150 relative to a typical laser spindle, the active angle of reflection θ of the optical scanning beam area can be approximately the same as for a typical laser spindle (e.g., having ten facets). In other words, the reduced diameter of the laser scanner spindle 150 relative to a typical laser spindle, along with the intersection of the substantially planar surface with the outer diameter of the laser scanner spindle 150, can result in an approximately equal proportion of the outer diameter that is within the active angle of reflection θ. As a result, the number of addressable pixels that can be provided by the optical scanning beam $OPT_{IMG}$ can be approximately the same as for typical laser scanner systems. Accordingly, the reduced size of the laser scanner spindle 150 relative to typical laser spindles does not compromise performance of the laser scanner system 10.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but is not limited to, and the term "including" means including but is not limited to. The term "based on" means based at least in part on.

What is claimed is:

1. A laser scanner system comprising:
    a scanner laser to generate an optical scanning beam;
    a spindle assembly comprising a spindle that extends along an axis and reflects the optical scanning beam, wherein the spindle is arranged as a substantially cylindrical spindle having a substantially planar surface that extends along the axial length of the spindle, the substantially planar surface being mirrored to correspond to the single facet to reflect the optical scanning beam;
    a beam detector to receive the reflected optical scanning beam from the single facet and to indicate when to generate a latent image corresponding to an image based on the optical scanning beam for a given scan operation; and a scan controller to control the scanner laser such that the optical scanning beam is reflected from only a single facet of the spindle during the given scan operation.

2. The system of claim 1, wherein the substantially planar surface extends radially inward with respect to an outer diameter of the substantially cylindrical spindle.

3. The system of claim 1, wherein the substantially planar surface is a first substantially planar surface, the spindle further comprising a second substantially planar surface, the first and second substantially planar surfaces being disposed opposite each other with respect to the axis.

4. The system of claim 3, wherein each of the first and second substantially planar surfaces are substantially congruent and are arranged as substantially centered between a first end and a second end of the spindle.

5. The system of claim 1, wherein the spindle assembly comprises a spindle motor to rotate the spindle, the spindle motor being configured as a two-phase DC induction motor comprising an outside stator and an inside rotor.

6. The system of claim 5, wherein the spindle motor is configured to rotate the spindle at a speed of at least 100,000 RPM.

7. The system of claim 1, wherein the spindle assembly comprises a spindle bearing system comprising one of an air bearing and a magnetic levitation bearing to couple the spindle to a rotor associated with a spindle motor.

8. A laser scanner spindle that extends along an axis between a first end and a second end and comprises a substantially cylindrical outer diameter, the laser scanner spindle comprising a single facet from which an optical scanning beam is to be reflected for a given scan operation that implements the laser scanner spindle, wherein the single facet comprises a first substantially planar surface that extends along the axial length of the laser scanner spindle with respect to the substantially cylindrical outer diameter, the first substantially planar surface being mirrored.

9. The laser scanner spindle of claim 8, further comprising a second substantially planar surface disposed opposite the first substantially planar surface with respect to the axis, the first and second substantially flat recesses being congruent.

10. The laser scanner spindle of claim 8, wherein the substantially planar surface extends radially inward with respect to the substantially cylindrical outer diameter of the laser scanner spindle.

11. The laser scanner spindle of claim 8, wherein the substantially cylindrical outer diameter is less than 3 millimeters.

12. A laser scanner system comprising:
a scanner laser to generate an optical scanning beam;
a spindle assembly comprising:
a spindle that extends along an axis and reflects the optical scanning beam, the spindle being arranged as a substantially cylindrical spindle having a substantially planar surface that extends along the axial length of the spindle and extends radially inward with respect to an outer diameter of the substantially cylindrical spindle, the substantially planar surface being mirrored to correspond to a facet;
a spindle motor to rotate the spindle; and
a spindle bearing system to couple the spindle to a rotor associated with the spindle motor;
a beam detector to receive the reflected optical scanning beam and to indicate when to generate a latent image corresponding to an image based on the optical scanning beam for a given scan operation; and
a scan controller to control the scanner laser such that the optical scanning beam is reflected from only the facet of the spindle during the given scan operation.

13. The system of claim 12, wherein the substantially planar surface is a first substantially planar surface, the spindle further comprising a second substantially planar surface, the first and second substantially planar surfaces being congruent and disposed opposite each other with respect to the axis.

14. The system of claim 12, wherein the spindle motor is configured as a two-phase DC induction motor comprising an outside stator and an inside rotor.

15. The system of claim 12, wherein the spindle bearing system comprises one of an air bearing and a magnetic levitation bearing.

* * * * *